(12) United States Patent
Sohng (10) Patent No.: US 7,352,295 B2
(45) Date of Patent: Apr. 1, 2008

(54) APPARATUS FOR AND METHOD OF INPUTTING ALPHABETS USING A REDUCED KEYPAD

(76) Inventor: Woo Chan Sohng, 204-702 Samsung Apt. Suji-2-cha, Pungduckchun-dong, Yongin-shi, Gyeonggi-do (KR)

( * ) Notice: Subject to any disclaimer, the term of this patent is extended or adjusted under 35 U.S.C. 154(b) by 274 days.

(21) Appl. No.: 10/544,153

(22) PCT Filed: Mar. 5, 2004

(86) PCT No.: PCT/KR2004/000473

§ 371 (c)(1),
(2), (4) Date: Aug. 1, 2005

(87) PCT Pub. No.: WO2004/080040

PCT Pub. Date: Sep. 16, 2004

(65) Prior Publication Data

US 2006/0055676 A1    Mar. 16, 2006

(30) Foreign Application Priority Data

Mar. 5, 2003    (KR)    ............ 10-2003-0013756
Feb. 11, 2004    (KR)    ............ 10-2004-0009086

(51) Int. Cl.
*H03M 11/00*    (2006.01)

(52) U.S. Cl. .................. 341/22; 345/173; 455/90; 708/146

(58) Field of Classification Search .......... 341/22, 341/31; 345/173; 178/18.03; 708/146; 455/90

See application file for complete search history.

(56) References Cited

U.S. PATENT DOCUMENTS

| | | | | |
|---|---|---|---|---|
| 3,996,557 A | * | 12/1976 | Donahey | .............. 382/186 |
| 6,031,471 A | | 2/2000 | Wilson | |
| 2002/0145592 A1 | * | 10/2002 | Schauer | .............. 345/156 |
| 2003/0064686 A1 | * | 4/2003 | Thomason et al. | ........ 455/90 |
| 2005/0088415 A1 | * | 4/2005 | To | .............. 345/168 |

FOREIGN PATENT DOCUMENTS

| | | |
|---|---|---|
| KR | 1999-0006320 | 1/1999 |
| KR | 2001-0001525 | 1/2001 |

* cited by examiner

*Primary Examiner*—Timothy Edwards, Jr.
(74) *Attorney, Agent, or Firm*—IPLA P.A.; James E. Bame (57) ABSTRACT

The invention concerns an apparatus for inputting English alphabets, comprising: a keypad having five buttons of one central button, a left top button, a left bottom button, a right top button and a right bottom button arranged at each vertex of a square shape an d around the central button; a means for sequentially receiving signals input by operating the buttons on the keypad and creating the signals as button input signal sequences; a means for storing an alphabet list or a look-up table comprising alphabet sequences consisting of sequential sequences of any button input signals and English alphabet representation data, wherein one alphabet representation is associated with at least one alphabet sequence; and an alphabet search and display means for searching the alphabet list and displaying a corresponding alphabet representation, using the button input signal or a series of button input signals whenever one button input signal is received. According to the invention, a user may input English alphabet to handheld electronics, in a manner similar to writing the alphabets with hands, for example using only one finger, e.g. a thumb.

5 Claims, 9 Drawing Sheets

APPARATUS FOR AND METHOD OF INPUTTING ALPHABETS USING A REDUCED KEYPAD

TECHNICAL FIELD

The present invention relates to a method of inputting characters or letters, e.g., English alphabets, using only five keys or buttons, and more particularly to an apparatus for and a method of inputting English alphabets, using only five buttons located at respective vertexes and at a center of a square shape, the apparatus being constructed to allow English alphabets to be input in a handwriting manner with one finger.

BACKGROUND ART

Today with the development in wireless communications, various functions such as sending/receiving text messages, saving telephone numbers, wireless Internet access, etc. are added to the functions of a cell phone, i.e., a mobile phone terminal, in addition to the simple voice conversation function. Accordingly, there is an increasing need for inputting letters, but there is a problem that it is difficult to make a large input device for a handheld device small in size. Therefore, there has been a need for a method of inputting letters while not significantly modifying the size of the input device and using a conventional keypad with 3×4 numeric keys or buttons without modification. With emerging of small or reduced devices such as PDA (Personal Digital Assistance) having a function of editing documents or tables which is possible with a large apparatus like a conventional desktop computer, there is an increasing need for an apparatus small in size but allowing alphabets to be input.

Figure 1:
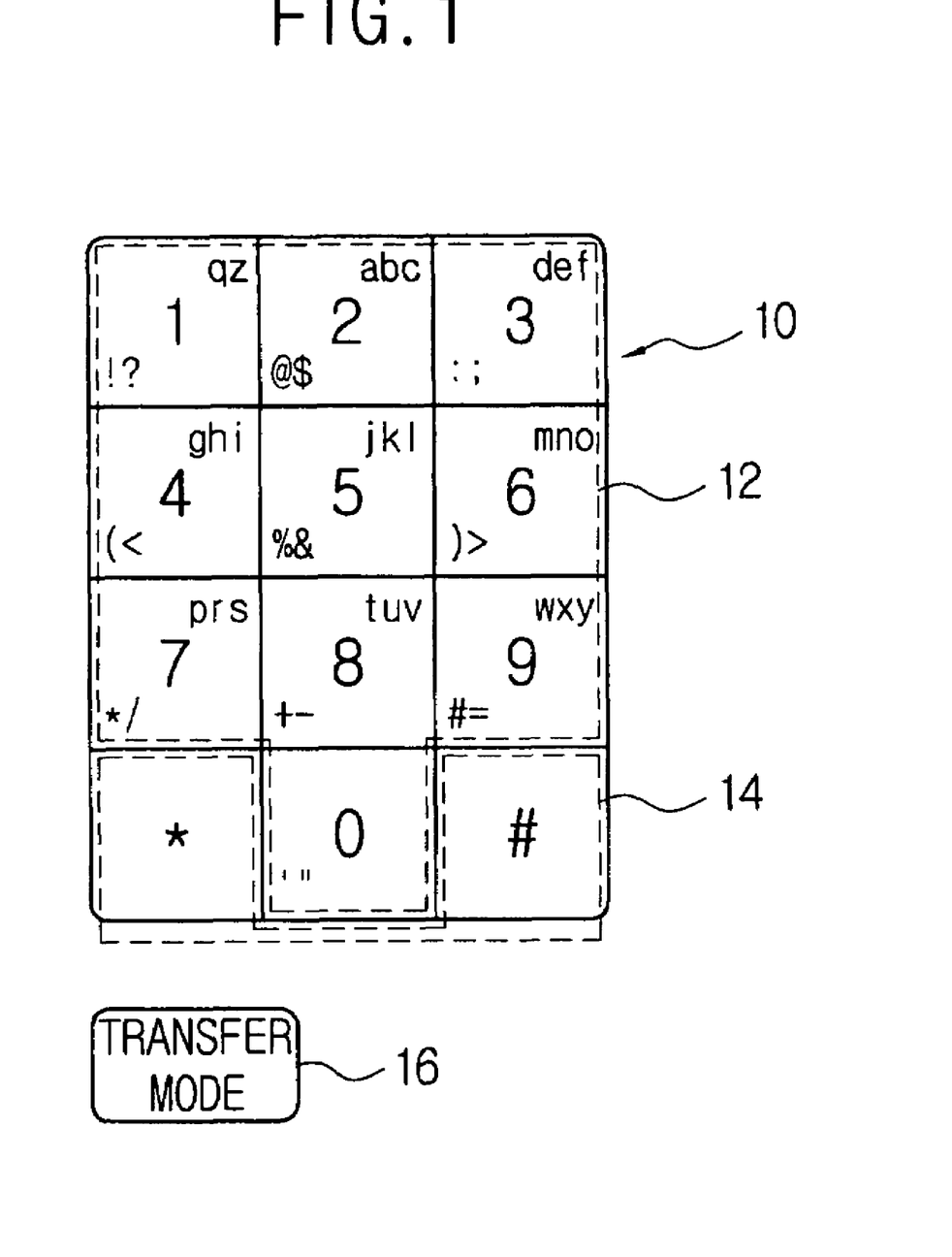
FIG. 1 shows schematically a conventional numeric keypad employed as an input device for a general small electronic apparatus.

In order to input alphabets with a typical reduced or small keypad, a method of inputting English alphabets using the keypad generally employed is to fixedly allocate two or three English alphabets onto each numeric button on the numeric keypad, as shown in FIG. 1. For example, if a user intends to input alphabets of "mobile", he has to press a button for transferring the node into an English input mode and then No. 6 button ("m" is displayed). He then has to press a separate button for ending alphabet input, No. 6 and then No. 3 button ("o" is displayed) and then the button for ending alphabet input, . . . and he has to continue to press buttons for the procedure. According to the aforementioned method, it is seen that the number of button presses in order to input six alphabets is very large and there is also not a given pattern in the operation of button press. Such an input method is not easy to use although a user memorizes the keypad number arrangement, and even annoys a beginner.

There have been proposals in order to achieve easy and rapid alphabet input by improving the conventional button number fixed alphabet allocation method. An example of the proposals is the Graffiti(trademark) method widely used in PDA devices such as Palm Tungsten Ts(trademark) (see http://palmone.com). The Graffiti method provides a separate input window in addition to a display screen on a PDA. When a user writes alphabet shapes according to a predetermined rule on the input window with, for example, a pen as if she/he takes a handwriting note, corresponding alphabets interpreted through a writing recognition program are displayed on the display screen. However, since every person has a different writing style, the alphabet recognition ratio is low and its speed is also slow, not satisfying people who are accustomed to a speedy keyboard input manner.

In addition, there is a method of inputting alphabets by means of a keypad used in BlackBerry(trademark) (see http://blackberry.com for more details), FASTAP(trademark) (see http://digitwireless.com for more details) and Treo 600(trademark) (see http://handspring.ccm for more details). The apparatuses provide compact keypads to allow a user to input alphabets in consumer electronics such as a small cell phone or PDA. In such a small keypad conventionally proposed, since relatively many buttons are densely arranged in a narrow space, it is not easy to use fingers in button operation (e.g. pressing the button). Another problem is that the user has to press small buttons one by one arranged in the narrow space to input alphabets, using an auxiliary device similar to a pen. Also, according to the method, the 3×4 button numeric keypad used in a conventional cell phone cannot be used without modification. In addition, the conventional modified small keypad for inputting alphabets are produced in different shapes depending on manufacturers and thus could be easily unified or standardized.

Therefore, there has been a need for technology that can implement new and easy alphabet input for which the conventional keypad is not significantly modified and the keyboards are thus easily unified.

DISCLOSURE

It is an object of the present invention to provide a method of inputting English alphabets, using a small keypad with new and additional advantages while solving the aforementioned problems of the conventional small keypad for inputting alphabets It is another object of the invention to provide an apparatus for and a method of inputting English alphabets, wherein the apparatus uses a new small keypad by arranging five buttons in a square shape and allows all the English alphabets to be input by means of only the five buttons.

It is still another object of the invention to provide an apparatus for and a method of inputting English alphabets, wherein the apparatus uses a new small keypad by arranging five buttons in a square shape and allows all the English alphabets to be input by means of only the five buttons on the conventional 3×4 button numeric keypad.

It is still another object of the invention to provide an apparatus for and a method of inputting English alphabets using a new and small keypad that allows all the English alphabets sufficiently to be input by means of only the five buttons by configuring a button arrangement modified in that one button is added to the four buttons on the conventional 3×4 button numeric keypad.

It is still another object of the invention to provide an apparatus for and a method of inputting English alphabets to allow a user to input relevant alphabets sequentially by pressing one or more buttons among five buttons in a manner similar to handwriting of alphabets intuitively.

It is still another object of the invention to provide an apparatus for and a method of inputting English alphabets, implemented by storing an alphabet list, in which at least one alphabet sequence consisting of one or more keypad button input signals is associated with each alphabet representation, displaying a most proper alphabet representation and/or extracting the alphabet representation by searching the alphabet list whenever one button input signal is received.

Also, it is still another object of the invention to provide an apparatus for and a method of inputting English alphabets using a button input signal sequence, wherein the button input signal can be automatically corrected although a user inputs incorrect signal sequence by any meaningless button operations.

Also, it is still another object of the invention to provide a soft keypad having the aforementioned features, which keypad shape is implemented either in software on a touch screen or in hardware.

In order to achieve the aforementioned objects, in one aspect of the invention, an apparatus for inputting English alphabets is provided. The apparatus comprises: a keypad having five buttons of a central button, a left top button, a left bottom button, a right top button and a right bottom button arranged at each corner or vertex of a square shape and around the central button; a means for sequentially receiving signals input by operating or pressing the buttons on the keypad and creating a button input signal sequence with the received signals; a means for storing an alphabet list or a look-up table having alphabet sequences consisting of sequential sequences of predetermined button input signals and English alphabet representation data, wherein one alphabet representation is associated with at least one alphabet sequence; and an alphabet search and display means for searching the alphabet list and displaying a corresponding alphabet representation to the created button input signal sequence whenever one button input signal is received.

The aforementioned each alphabet sequence in the alphabet list nay consist of input signals by means of one or more buttons arranged on the keypad, the buttons for the stored alphabet sequence being arranged to be similar pattern to a handwriting shape of the associated alphabet representation. Two adjacent signals of the button input signals consisting of a specific alphabet sequence may be determined by means of one or two adjacent or consecutive keys or buttons on the keypad. In addition, the central button may be further allocated functions of switching to and releasing from the English alphabet input mode, and/or switching between the capital and small English alphabet input modes.

The keypad according to the present invention is a variation produced by varying a part of the conventional 3×4 numeric keypad, and the central button may be arranged at the center of the adjacent four buttons in the numeric keypad in addition. Alternatively, in the keypad, the No. 1,3,5,7 and 9 buttons may be used with the 3×4 numeric keypad.

According to a preferred embodiment of the invention, the keypad may be implemented in software on a touch screen. It is preferred that the keypad implemented in software may be embodied to be displayed semi-transparently or translucently.

In another aspect of the invention, a method of inputting English alphabets is provided using a keypad comprising five buttons of one central button, a left top button, a left bottom button, a right top button and a right bottom button arranged at each vertex of a square shape and around the central button. The method comprises the steps of receiving each button input signal generated by operating or pressing each button on the keypad; creating a button input signal sequence to which a button input signal currently input is added when one button input signal is received; searching an alphabet list comprising alphabet sequences consisting of sequential sequences of button input signals and English alphabet representations associated with at least one alphabet sequence, for a matched alphabet representation using the created button input signal sequence; and displaying the matched alphabet representation if there is the matched alphabet representation, then receiving a next button input signal and repeating said creating, searching, and displaying steps.

In a further another aspect of the invention, a method of inputting English alphabets is provided by searching an alphabet list stored in advance and having alphabet sequences consisting of a series of button input signals and alphabet representations associated with the alphabet sequences, and by displaying the alphabet representations depending on the button input signal sequences sequentially input. The method comprises the steps of: a first wait step of waiting a button input signal; adding a received button input signal and creating a button input sequence; searching the alphabet list using the button input signal sequence; a preliminary alphabet extraction step of displaying an alphabet representation associated with an alphabet sequence when there is the alphabet sequence corresponding to the button input signal sequence in the search step, and returning to the first wait step; a second wait step of deciding if there is an alphabet sequence having the predetermined sequence corresponding to the created button input signal sequence as a part if there is no alphabet sequence corresponding to the button input signal sequence in the search step, and then returning to the first wait step if there is an alphabet sequence having such a part.

According to an embodiment of the invention, said method further includes an incorrect input correction or error correction step of deciding if there was the preliminary alphabet extraction step after the search step when a button input signal was received if there is no alphabet sequence having the part, ignoring all the button input signals of the created button input signal sequence received up to now if there was no preliminary alphabet extraction step and then returning to the first wait step; and a determined alphabet extraction step of, if so, extracting and displaying the preliminary-extracted alphabet representation as a determined alphabet, creating a next button input signal sequence having only the currently received button input signal and then returning to the search step.

Herein, each alphabet sequence comprised in the alphabet list is associated with one corresponding alphabet representation. Alphabet button input signals comprised in each alphabet sequence can consist of sequential input signals by means of one or more buttons arranged in a shape similar to a written shape of the alphabet representation associated with the alphabet sequence. Also, two adjacent signals of the button input signals consisting of the stored alphabet sequence can be determined as the signals generated by one or two adjacent or consecutive buttons on the keypad. The incorrect input correction or error correction step can further comprise a step of generating sound for notifying errors. The button input signal can be input by means of a keypad comprising five buttons of one central button, a left top button, a left bottom button, a right top button and a right bottom button arranged at each vertex of a square shape and around the central button. In this case, the keypad is a variation produced by varying a part of the conventional 3×4 numeric keypad. The central button can further be arranged at the center of the adjacent four buttons of the conventional numeric keypad. Alternatively, the keypad can be configured with No. 1,3,5,7 and 9 buttons in the conventional 3×4 numeric keypad.

Also, the invention provides a computer-readable recording medium to which a software program is recorded comprising program instructions implemented so that each step of the methods can be executed by a microprocessor.

DESCRIPTION OF DRAWINGS

These and other features, aspects, and advantages of the present invention will become apparent through the following description, illustrated in the appended drawings. In the drawings.

BEST MODE

Hereinafter, with reference to the accompanying drawings, the present invention will be described in detail with the aid of specific embodiments. The same reference numerals in the figures denote the same relevant means or components.

The apparatus for inputting English alphabets according to the invention comprises a keypad having a plurality of buttons and a processor for receiving and processing signals input by means of the keypad and displaying the processed input signal as an alphabet representation. The processor can be connected to devices for further processing, e.g., a display, a speaker or a data transmitter. Such an input apparatus may be applicable for an input apparatus of small consumer electronics, e.g., a cell phone or a PDA, etc.

Figure 2:
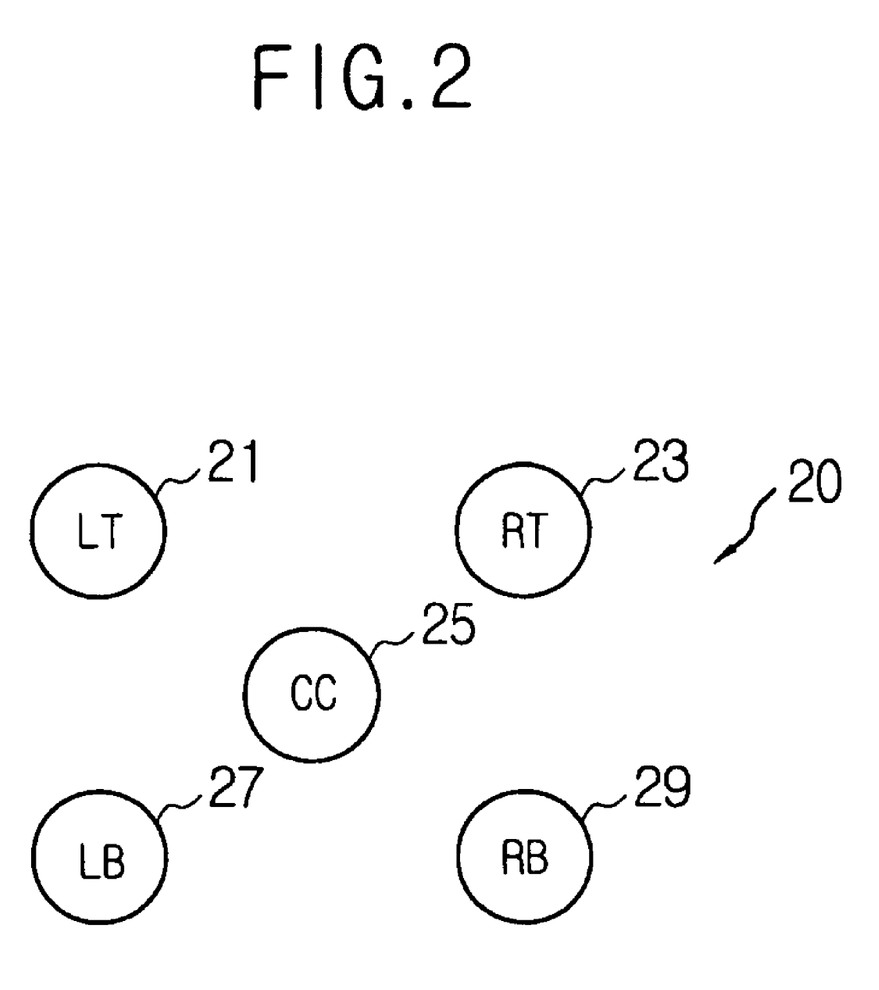
FIG. 2 is a schematic diagram illustrating a five-button type alphabet input device according to the invention.
Figure 5:
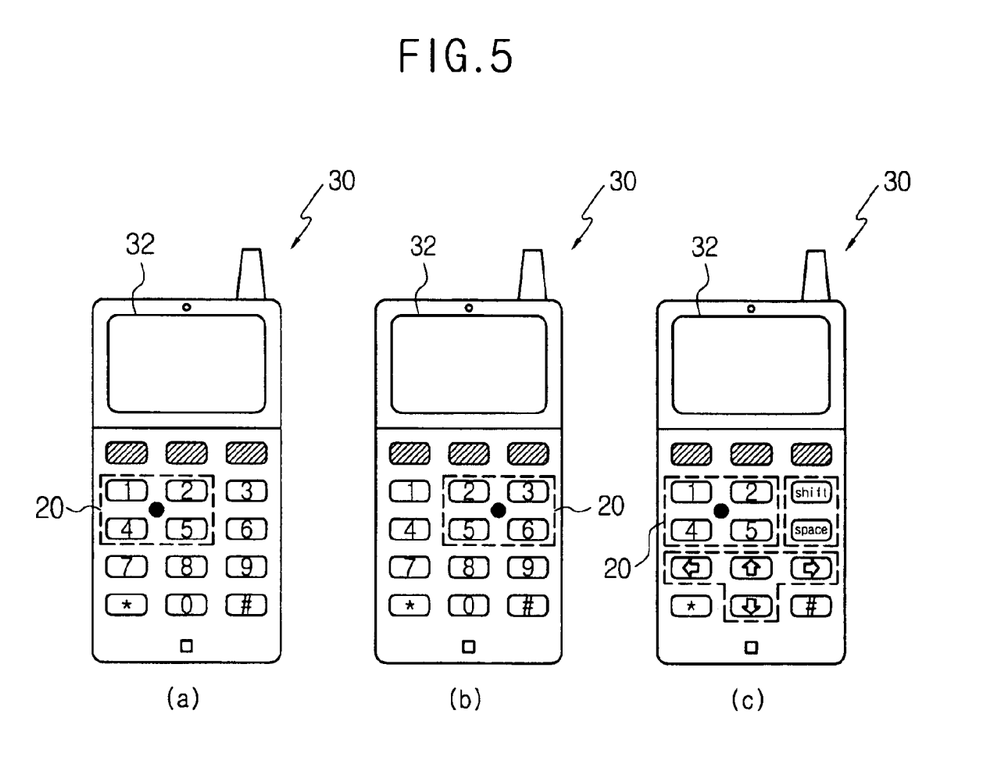
FIGS. 5 and 6 show schematically variations of a five-button type English alphabet input device according to the invention.
Figure 6:
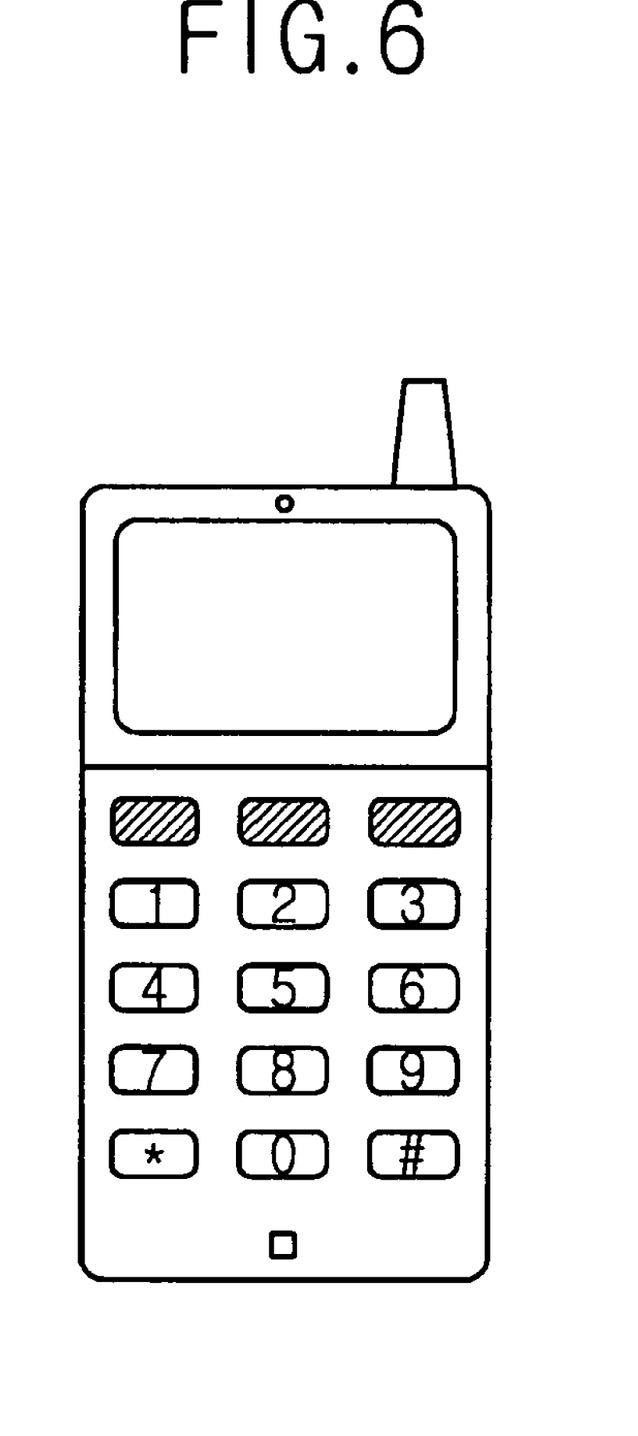

In FIGS. 2, 5 and 6, a keypad 20 is shown comprising five buttons for inputting English alphabets according to the invention. Such a five-button keypad (hereinafter, often called an 'easy script area') can be separately configured and added to a conventional numeric keypad. The five-button keypad, as shown in FIGS. 5 and 6, has an advantage that it can be constructed by slightly modifying the conventional numeric keypad or without modification. Since the keypad arrangement for inputting English alphabets according to the invention uses only five buttons, it can be advantageously installed easily in a cell phone or a PDA and small consumer electronics, e.g., a wristwatch or a game control pad.

As shown in FIG. 2, the keypad 20 as an input device for English alphabets according to the invention has a structure that each button is arranged at each corner or vertex of a square shape and one button is arranged at the center thereof. Hereinafter, for the purpose of simple description, the five buttons will be referred to as an LT (Left-Top) button 21, an RT (Right-Top) button 23, a CC (Center-Center) button 25, an LB (Left-Bottom) button 27 and an RB (Right-Bottom) 29.

According to the invention, a user can input alphabets by pressing the five buttons 21, 23, 25, 27 and 29 in a given pattern, preferably in a pattern similar to the writing shape of a corresponding alphabet in specified order, as will be described in detail hereinafter. When inputting alphabets, the user may successively press adjacent buttons to input one alphabet. Therefore, it is an advantage of the method of inputting English alphabets according to the invention that it is possible to input the alphabets in a manner similar to writing the alphabets with one finger, e.g., a thumb.

The input button signal from each button on the keypad is input sequentially to a processor (not shown) comprising a control device, e.g., a microprocessor. A specific hardware configuration of such a processor is not described in detail herein because it is already well known to those skilled in the art of signal processing for alphabet input using a conventional keypad.

Figure 3A:
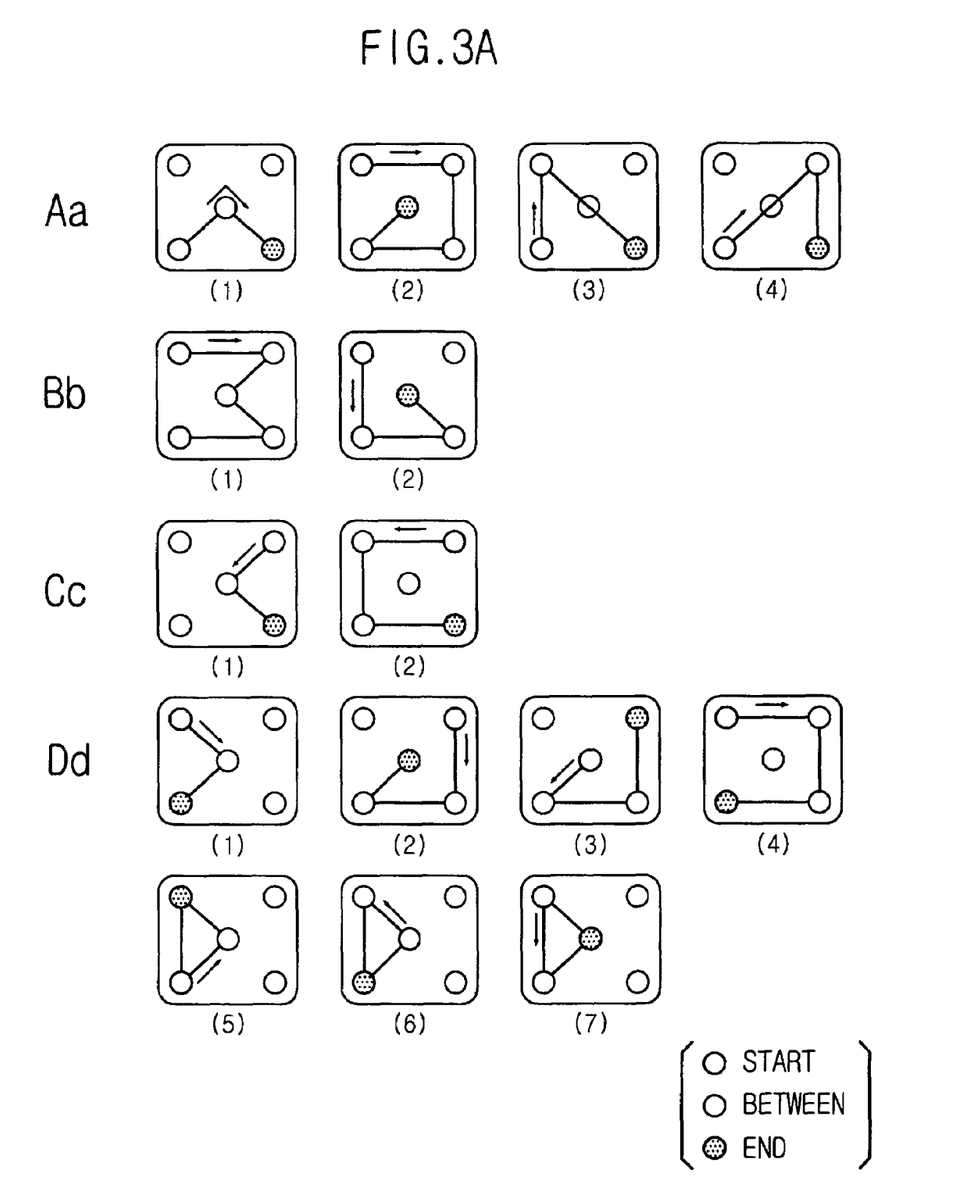
FIGS. 3a to 3b show schematically methods of inputting respective alphabets and special marks by means of a five-button alphabet input method according to the invention.
Figure 3B:
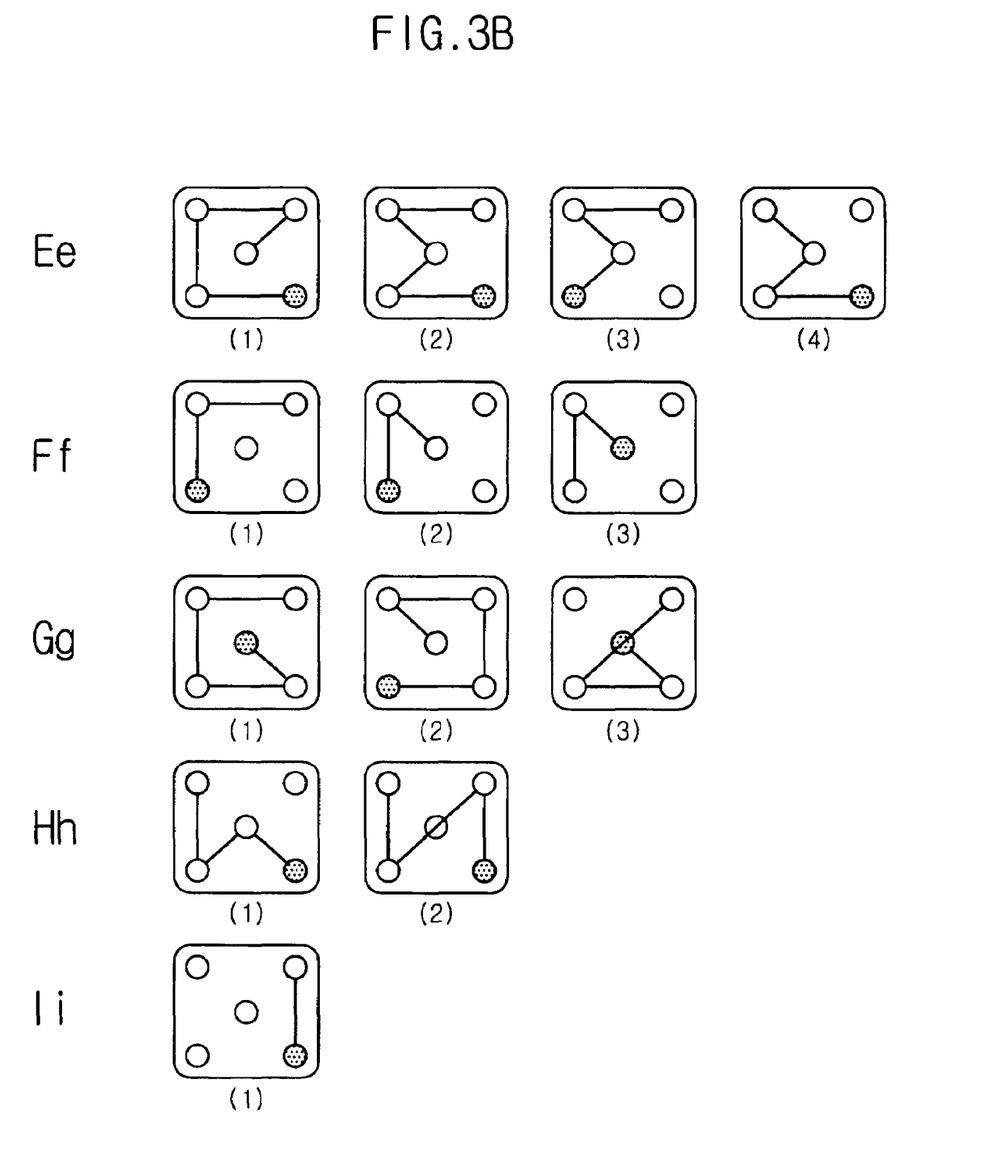
Figure 4:
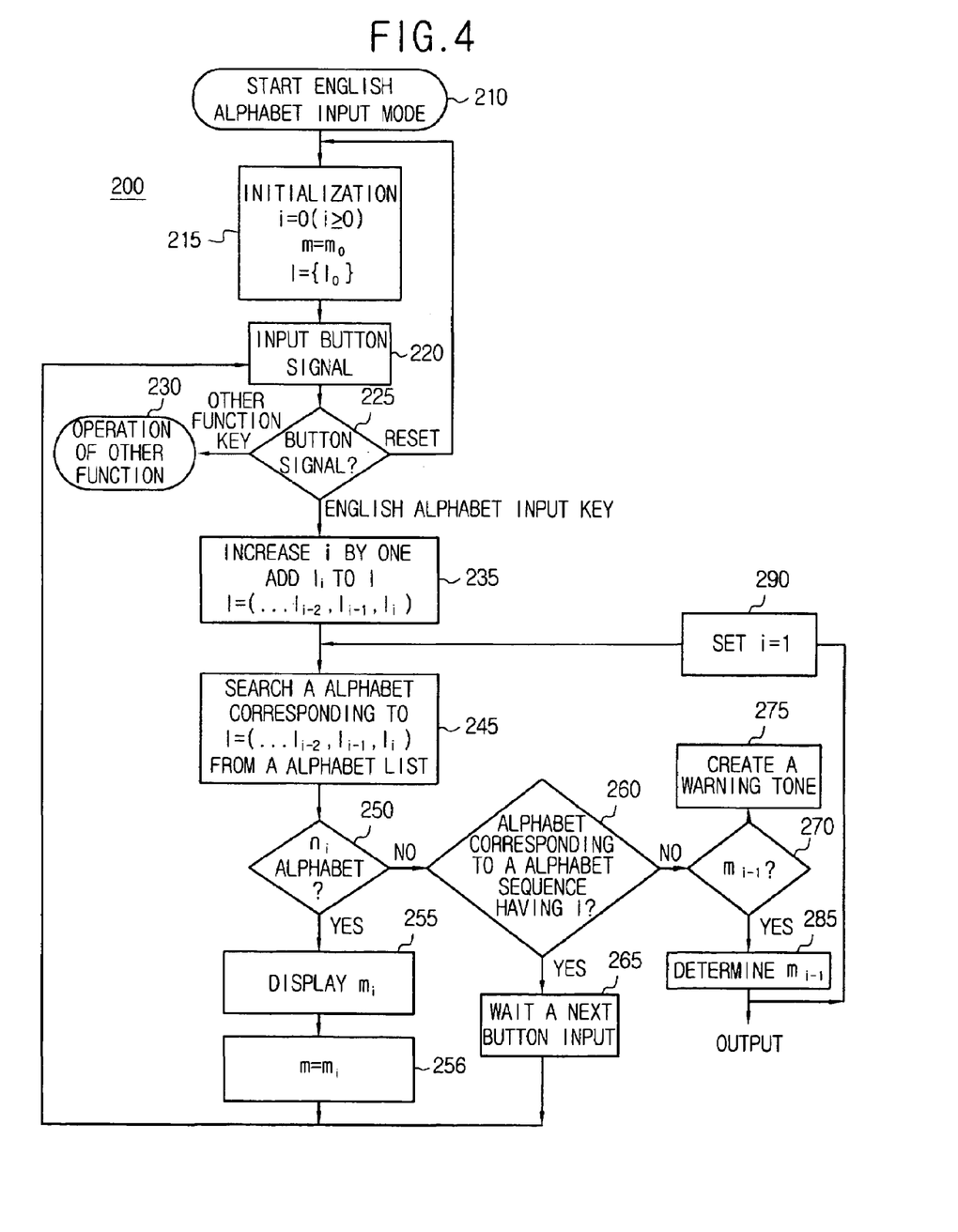
FIG. 4 is a flow chart showing steps of extracting alphabet representations depending on button inputs in inputting English alphabets according to the invention.

The input button signals from the keypad 20 are used to extract corresponding alphabet representations one-by-one by the processor through the steps shown in FIG. 4. In this case, the control device may search an alphabet list (not shown), for example, as shown in FIGS. 3a to 3g, which includes alphabet representations and corresponding alphabet sequences, each alphabet representation being associated to one or more alphabet sequences consisting of predetermined one or more button input signals. The alphabet list may be a look-up table searched by the control device, stored in a memory of the processor, and embedded in consumer electronics having the keypad input apparatus. According to the invention, retrieval of alphabets by means of the control device is preferably made each time one button is pressed, as will be described in more detail hereinafter.

The method of inputting alphabets according to the invention is characterized in that the buttons arranged similarly to the shape of writing a corresponding alphabet are pressed, in order to input an alphabet. In FIGS. 3a to 3g, examples of the input patterns for English alphabets and various sentence marks are shown. As illustrated, for example, in order to input an alphabet representation "a", the user can press sequentially the buttons LB, CC and RB in the five-button keypad area, that is the easy script area 20. In this case, as apparent in the Figures, the buttons that have to be pressed are arranged to be adjacent to each other and also to be similar to the shape of "a", so that the user can press corresponding buttons in a manner of writing "a" as if she/he draw a line with one finger.

In addition, the input sequence pattern of the capital "A" may be identical to the input sequence pattern of the small 'a'. In one embodiment of the invention, for the case that a same button input pattern are used for the corresponding small and capital characters, if it is a small alphabet input mode, small alphabets are displayed and, if it is a capital alphabet input mode, capital alphabets are displayed.

As shown in the FIGS. 3a to 3g, there may be four types of button input sequence related to "A" or "a". There may be two types of input sequence related to "B" or "b". There may be two types of input sequence related to "C" or "c". For another English alphabets or sentence marks, respectively, one or more input sequence patterns may be related as shown in FIGS. 3a to 3g.

In addition, to the event pressing the central button longer, a special function such as a function for switching to/releasing from the English alphabet input mode may be allocated.

According to one embodiment of the invention, the button input sequence for each alphabet representation described in the above is attributed independently without duplication for all the alphabets. Said attribution is possible, because the number of sequential possible combinations consisting of one, two, three or four buttons among the five buttons is sufficiently larger than the number of alphabet ? English—representations.

Furthermore, as shown in FIG. 3g, it is possible to allocate button input sequences without duplication for the sentence marks frequently used such as comma(,), period(.), etc., together with English alphabet representations. It should be noted that the examples shown in FIGS. 3a to 3g exemplify only some of many possibilities, and those skilled in the art would easily understand that various combinations are possible alternatively and/or additionally.

Figure 7:
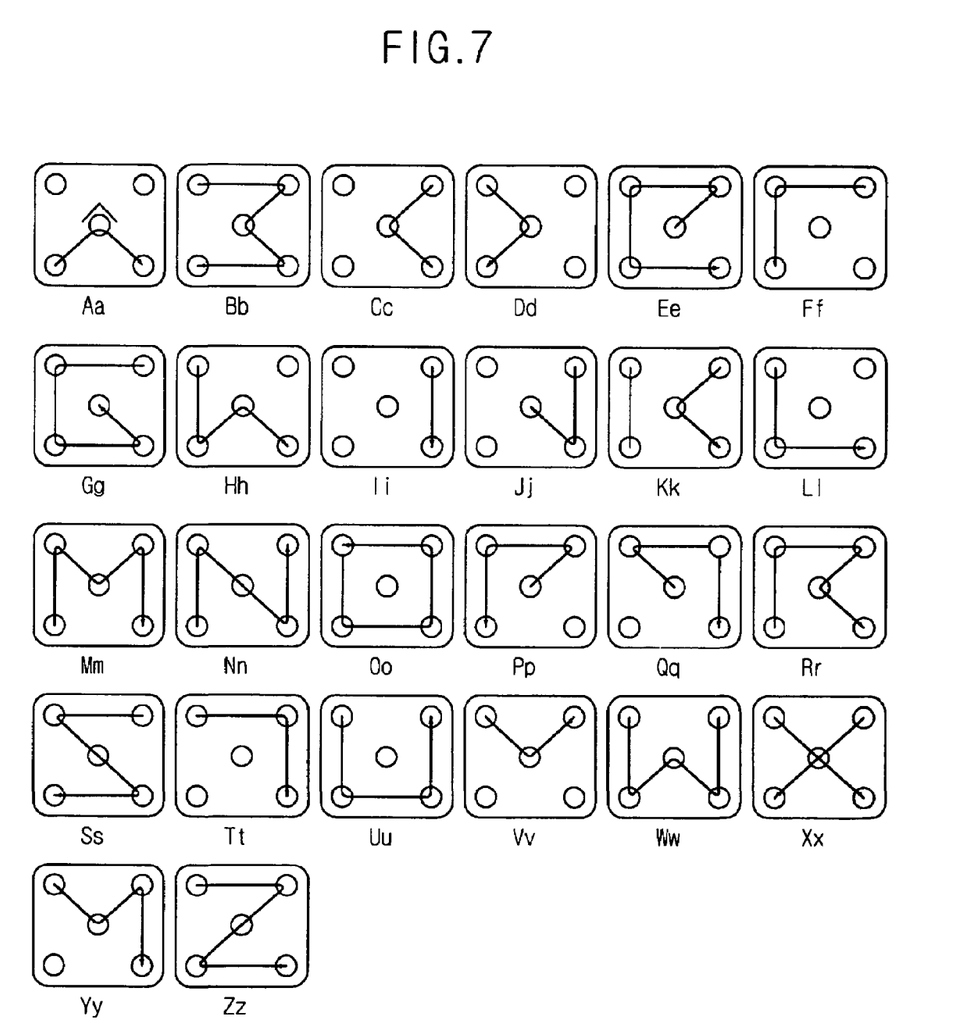
FIG. 7 illustrates schematically a set of English alphabet button input sequence each of which is collected from English alphabet button input sequences shown in FIGS. 3a to 3f, respectively.

In FIG. 7, an example of input patterns for a set of English alphabets A to Z is illustrated in its entirety according to the method of the invention. This is an example by collecting each one from alphabet representations input patterns corresponding to each alphabet representation shown in FIGS. 3a to 3f. According to the invention with reference to FIG. 7, the pressing order (indicated by arrows) for each button sequence can be implemented more freely, while limited only by the button's size, so that the advantage of alphabet input as writing alphabets is more apparently understood.

Figure 8:
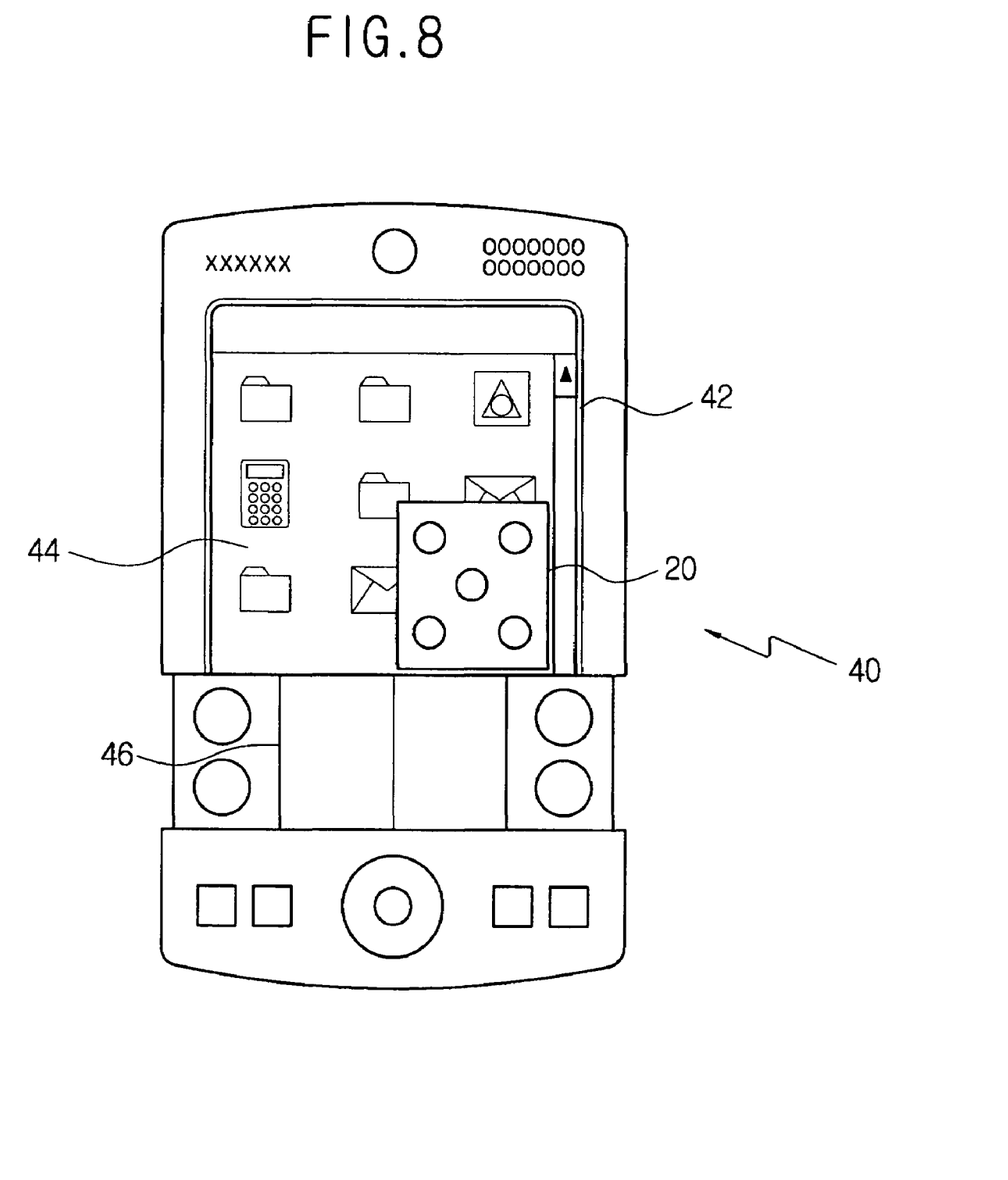
FIG. 8 shows schematically an example in which a five-button keypad according to the invention is employed on a touch screen of a PDA.

FIG. 8 shows an example of the five-button keypad according to the invention implemented in software to be displayed on a touch screen of a PDA. The PDA 40 may generally comprise a display 42 window for displaying information 44, e.g., alphabets, images or animation, etc., and an input device such as a keypad and/or, e.g., a Graffiti input window 46. The five-button keypad according to the invention i.e. the easy script area 20 may be implemented as shown on a part of the display 42 of the PDA 40. First, by activating a given function key, the user may make the easy script area 29 displayed. Subsequently, he may input a desired alphabet as a manner described in the above with reference to FIGS. 3a to 3g and FIG. 7, by means of the displayed part as an easy script area 20, using an input device such as a finger or a touch pen. Then the program installed in the PDA, that is the program executing the steps that will be described in detail hereinafter with reference to those shown in FIG. 4, will be executed, and the alphabet that the user wants to input may be displayed on the display 42 window. According to the invention, the easy script area 20 in a soft keyboard shape displayed on the touch screen display 42 is preferred to be displayed semi-transparently or translucently. Since the translucent easy script area 20 does not interrupt the displayed contents of information 44, it is preferred to be implemented in a small apparatus such as a PDA. According to this embodiment, the keypad of opaque/translucent soft keyboard type on the touch screen may be implemented by applying soft keyboard technology implemented on a touch screen of a conventional PDA, except for the display arrangement of keypad buttons and the process related to interpretation of alphabet input signal sequences.

According to another aspect of the invention, a method of inputting English alphabets or charactors is provided, using a plurality of button input sequences. The method can be implemented by a processing circuit, etc. having a control device such as, e.g., a microprocessor of a cell phone. Such a processing circuit comprises a storage means, e.g., a memory for storing a predetermined alphabet list or a look-up table of button input signal sequences related to each alphabet representations illustrated in FIGS. 3a to 3g. The control device may be responsible for processing input button signals when the user inputs signals by means of the buttons and for controlling related devices for displaying the resulting extracted alphabets. FIG. 4 shows in detail the process of extracting alphabets using the button input signal sequence. The alphabet extraction process may be executed by the control device of the processing circuit. According to the method shown in FIG. 4, when an alphabet representation such as an alphabet "A", "a" or a sentence mark "!", "?" may be extracted, the extracted alphabet representation may be displayed on the LCD display of a cell phone.

With reference to FIG. 4, the alphabet extraction process 200 by means of the control device will be described in more detail. According to the invention, when a user presses a button, a corresponding signal, for example, a DTMF signal, is generated. Then the generated button signal is subject to the alphabet extraction process 200 executed by the control device. The alphabet extraction process 200 may comprise a first wait step 220 of waiting button input signals. The process 200 also comprises a step 235 of creating a button input sequences; a step 245 of searching the alphabet list or the look-up table; a preliminary alphabet extraction or retrieval step 255 and 256 of displaying alphabet representations and returning to the first wait step; a second wait step 265 of returning to the first wait step without preliminary alphabet extraction; a first incorrect input correction or error correction step 275 of ignoring all the button input signals of the created button input sequence at the creating step 235 received up to now; and a determined alphabet extraction step 285 of extracting alphabets and returning to the search step.

More specifically, according to the invention, a signal sequence input by a user is compared with the alphabet sequences included in the alphabet list or the look-up table stored in advance (a part of the alphabet list is illustrated in Table 1), so that a specific alphabet representation may be extracted or retrieved. The alphabet list comprises alphabet sequences consisting of a series of button input signals (alphabet sequence 1 and alphabet sequence 2 in Table 1) and alphabet representations (A, a, etc. in Table 1) associated with the one or more alphabet sequences.

TABLE 1

| Alphabet representation | Alphabet sequence 1 | Alphabet sequence 2 |
|---|---|---|
| A, a | LB, CC, RB | LT, RT, RB, LB, CC |
| B, b | LT, RT, CC, RB, LB | LT, LB, RB, CC |
| C, c | RT, CC, RB | |
| D, d | LT, CC, RB | |
| E, e | CC, RT, LT, LB, RB | |
| F, f | RT, LT, LB | |
| G, g | CC, RB, LB, LT, RT | |
| H, h | LT, LB, CC, RB | |
| I, i | RT, RB | |
| J, j | RT, RB, CC | |
| K, k | LT, LB, RT, CC, RB | |
| L, l | LT, LB, RB | |
| M, m | LB, LT, CC, RT, RB | |
| O, o | LB, LT, RB, RT | |
| P, p | LB, RB, RT, LT | |
| Q, q | CC, RT, LT, LB | |
| R, r | CC, LT, RT, RB | |
| S, s | RT, LT, RB, LB | |
| T, t | LT, RT, RB | |
| U, u | LT, LB, RB, RT | |
| V, v | LT, CC, RT | |
| W, w | LT, LB, CC, RB, RT | |
| X, x | RT, LB, LT, RB | |
| Y, y | LT, CC, RT, RB | |
| Z, z | LT, RT, LB, RB | |
| Reset | LT~ | |

In the above Table 1, LB is referred to a left-bottom button, LT to a left-top button, RB to a right-bottom button, RT to a right-top button, and CC to a Center-Center button.

First, when the user continues to press, for example, the CC button for more than a specified time, the five-button English small alphabet input nude according to the invention may start in step 210. In the initialization step 215, the count i is initialized i.e. is loaded with a value of null (0). And the alphabet value m showing an alphabet representation and the button input signal sequence I are also initialized by being loaded with a value of null (0).

In the first wait step 20, the control device waits a next button input signal to be received. When the next signal is input, the count i is increased by one. The button input signal currently input by a user and received by the control device is added to the signal previously input (if any) then to create a button input signal sequence (I) in step 235. The button input signal sequence (I) created in this step 235 is compared with the alphabet sequences contained in the alphabet list so that the associated alphabet representation may be searched for.

In addition, it will be basically determined whether the button signal prior to this creation step 235 is from a reset button or a button for transfer to another function or a button (key) for transfer to/release from the input mode of another language in step 225. If it is a reset button (for example, a signal created by pressing the LT button long for a specified time), the process would return to the initialization step 215. If it is another function key, the alphabet extraction process would be aborted and the corresponding function would be initiated in step 230.

Once a button input signal sequence I is created, the alphabet list is searched, with the created button input signal sequence I. In this step 245, search and comparison operation are carried out so that whether an alphabet sequence corresponding to the button input signal sequence I exists in the alphabet list may be determined.

In step 250, it is decided whether the stored alphabet sequence of the alphabet list and an associated alphabet representation corresponding to the created button input signal sequence I at the search step exist. If there is corresponding one, the process goes to the step 255 of preliminary alphabet extraction to display an associated alphabet representation mi and returns to the first wait step 220 after adding the alphabet representation mi to the alphabet value m in step 256. For example, when the currently input button is the LB button but the button input signal sequence {LT, LB} created by adding the LB button signal to the LT button signal which is the previous signal, it conforms to the alphabet sequence associated with the alphabet representation "i". Therefore "i" is displayed. Since the alphabet extracted in this step nay not be the one determined, this step is called a preliminary alphabet extraction step. For extracting an alphabet definitely, the process must be subject to this preliminary alphabet extraction step.

If it is decided that an alphabet sequence corresponding to the button input signal sequence does not exist in the search step (NO, in step 250), then it is decided whether an alphabet sequence containing a sequence corresponding to the button input signal sequence as a part in step 260. If such an alphabet sequence exists (that is, YES), the process returns to the first wait step without any display as a second wait step in step 265. If a user presses, for example, the LB button for the first time after initialization, the alphabet corresponding only to the button input signal sequence (LB) does not exist with reference to Table 1. However, there are a plurality of alphabet representations such as "a", "m", "o", and "p" as an alphabet partially having the button input signal sequence (LB). In this case, since it is impossible to determine one alphabet representation, the process waits a next button input without any displayed alphabet representation at the current button input.

If there is no alphabet sequence having the sequence as a part (that is, NO), it is decided whether the preliminary alphabet extraction step existed after the search step when a button input signal was received previously in step 270. If not (that is, no mi-1), the process goes to the incorrect input correction or error correction step. The incorrect input correction step ignores all the button input signals of the currently created button input signal sequence received up to now for returning to the first wait step. In this case, a warning sound (beep) can be generated to notify incorrect input in step 275. For example, if the button input signal sequence created when the user presses the RB button is a sequence having only an RB signal, there is no alphabet representation even partially associated with the created sequence, in Table 1, and all the button input signals in the created sequence up to now (the RB button only in this example) are ignored or deleted, the process can go to the step of waiting a next button input while generating a warning sound. According to the incorrect input correction step, the button sequence incorrectly input is automatically deleted. Therefore, the user can start another button input for a desired alphabet without additional button operation for deletion.

In case of YES in step 270 (that is, there is mi-1), the displayed alphabet representation is extracted and displayed as a determined alphabet in step 285. At the same time, a button input signal sequence only having the button input signal currently received is created again in step 290 and the process returns to the search step. This step is called a determined alphabet extraction step. Only through this step, an alphabet will be determined. For example, if the user presses the LT button and thus creates a button input signal sequence to be RT, RB and LT, there is no alphabet representation associated with the alphabet sequence to be RT, RB and LT in Table 1. However, the alphabet "i" was preliminary-extracted by means of the RT and RB sequence at the previous button input. Accordingly the alphabet "i" preliminarily-extracted in the previous button input is determined as a determined alphabet in the current button input. At the same time, a button input signal sequence only having the button input signal currently received is created newly. In this example, the process will return to the step of serching the alphabet list again, using the newly created sequence consisting of only LT.

Hereinabove, the method of inputting alphabets using a five-button keypad as shown in FIG. 2 has been described. The method of inputting alphabets according to the invention can be implemented by means of a keypad modified as shown in FIGS. 5 and 6. With reference to FIG. 5, according to the invention, a variation is shown where a central button (indicated as a black dot) is added on the conventional numeric input keypad. FIG. 5(*a*) shows a variation where the buttons 1,2,4 and 5 among numeric buttons are used for LT, LB, RT and RB buttons and a central button is additionally provided at the center. FIG. 5(*b*) shows a variation where the buttons 2,3,5 and 6 among numeric buttons are used for LT, LB, RT and RB buttons and a central button is additionally provided at the center. FIG. 5(*c*) shows an application example where the rest numeric buttons 3, 6, 7, 8, 9 and 0 are specified as shift, space, left, right, up and down arrow buttons, respectively, unlike in FIG. 5(*a*). The aforementioned variations may be advantageously applicable to small consumer electronics such as a conventional cell phone or PDA without significantly modifying the structure thereof.

The variation of the invention as shown in FIG. 6 is an example to use the conventional numeric keypad without modification. That is, this is an example to specify the buttons 1, 3, 5, 7 and 9 on the conventional numeric keypad as LT, RT, CC, LB and RB buttons, respectively. In this case, the method according to the flow chart shown in FIG. 4 can be applied as it is, except that when the mode is transferred to the English alphabet input mode, the process is added for setting inputs from the rest buttons of No. 2, 4, 6 and 8 buttons to be discarded in the initialization step. Therefore, in case of such a variation, it is advantageous that it can be implemented in conventional handheld electronics by installing a software program for implementing the method according to the invention.

The invention can also be achieved by means of the steps implementing the method according to the invention by logically processing input button signals and by searching the list stored in advance. Therefore, the invention can be implemented by means of program instructions implemented to be executed by a microprocessor. Accordingly, the invention also provides a computer-readable recording medium on which a software program for achieving the objects of the invention is recorded.

Hereinabove, the invention has been described by means of specific embodiments. However, it should be understood that the detailed description and specific examples, while indicating preferred embodiments of the invention, are given by way of illustration only, since various changes, combinations and modifications within the spirit and scope of the invention will become apparent to those skilled in the art from this detailed description. Therefore it should be noted that the scope of the invention should be only limited by those claimed in the claims.

The invention claimed is:

1. An apparatus for inputting English alphabets using a reduced keypad, characterized by comprising:

a keypad having five buttons of one central button, a left top button, a left bottom button, a right top button and a right bottom button arranged at each vertex of a square shape and around the central button;

a means for sequentially receiving signals input by operating the buttons on the keypad and creating the signals as a button input signal sequence;

a means for storing an alphabet list having alphabet sequences consisting of sequential sequences of button input signals and English alphabet representation data, wherein one alphabet representation is associated with at least one alphabet sequence, wherein the central button is further allocated functions of start and release of the English alphabet input mode, and switching between the English small and capital alphabet input modes; and an alphabet search and display means for searching the alphabet list and displaying a corresponding alphabet representation, using the button input signal sequence whenever one button input signal is received.

2. The apparatus as claimed in claim 1, characterized in that each alphabet sequence in the alphabet list consists of input signals by means of the one or more buttons arranged on the keypad, and the buttons for the alphabet sequence is arranged to be similar pattern to writing shape of the associated alphabet representation.

3. The apparatus as claimed in claim 1, wherein two adjacent signals of the button input signals consisting of the alphabet sequence are generated by one or two adjacent buttons on the keypad.

4. The apparatus as claimed in claim 1, wherein the keypad is produced by varying a part of a 3×4 numeric keypad and the central button is further arranged at the center of adjacent four buttons on the numeric keypad.

5. The apparatus as claimed in claim 1, wherein the keypad is configured using "?", "1", "3", "5", "7" and "9" buttons on the 3×4 numeric keypad.

* * * * *